United States Patent
Chun

(10) Patent No.: US 6,793,366 B2
(45) Date of Patent: Sep. 21, 2004

(54) WATERTIGHT, LOW POWER L.E.D. FLASHLIGHT

(76) Inventor: James K. Chun, 2102-F Walsh Ave., Santa Clara, CA (US) 95050

( * ) Notice: Subject to any disclaimer, the term of this patent is extended or adjusted under 35 U.S.C. 154(b) by 0 days.

(21) Appl. No.: 10/104,895

(22) Filed: Mar. 22, 2002

(65) Prior Publication Data
US 2003/0179573 A1 Sep. 25, 2003

(51) Int. Cl.[7] .............................. F21L 4/02; H05B 37/02
(52) U.S. Cl. ........................ 362/184; 362/183; 362/116; 362/200; 362/396; 315/307; 315/242
(58) Field of Search ................................ 362/200, 205, 362/157–158, 183, 190, 184, 116, 396, 800, 267, 186; 315/241–242, 224–225, 307

(56) References Cited

U.S. PATENT DOCUMENTS

| | | | |
|---|---|---|---|
| 3,162,376 A | * 12/1964 | Furuya | 362/158 |
| D311,067 S | 10/1990 | Chabria | D26/37 |
| 5,418,433 A | 5/1995 | Nilssen | 315/175 |
| 5,460,346 A | * 10/1995 | Hirsch | 248/229.13 |
| 5,498,934 A | * 3/1996 | Nilssen | 315/224 |
| 5,646,484 A | 7/1997 | Sharma et al. | 315/74 |
| D425,228 S | 5/2000 | Kibler | D26/46 |
| 6,095,661 A | 8/2000 | Lebens et al. | 362/184 |
| 6,168,288 B1 | 1/2001 | St. Claire | 362/184 |
| 6,231,207 B1 | 5/2001 | Kennedy et al. | 362/158 |
| 6,246,184 B1 | 6/2001 | Salerno | 362/291 |
| 6,296,367 B1 | 10/2001 | Parsons et al. | 362/183 |
| 6,305,818 B1 | 10/2001 | Lebens et al. | 362/184 |
| 6,366,028 B1 | * 4/2002 | Wener et al. | 315/241 P |
| 6,445,132 B1 | * 9/2002 | Ford | 315/56 |

* cited by examiner

Primary Examiner—Alan Cariaso
Assistant Examiner—Ali Alavi
(74) Attorney, Agent, or Firm—Dean A. Craine

(57) ABSTRACT

A watertight, low power flashlight is disclosed that uses a voltage tripler and regulator that enables the use of a single AA or lithium battery. The voltage tripler is a "step-up power component" that raises the battery voltage from 1.5 volts to approximately 5 volts required to sufficiently energize the L.E.D.s. The flashlight also includes a lightweight, compact housing with an optional dimmer switch and a side-mounted on/off switch.

10 Claims, 9 Drawing Sheets

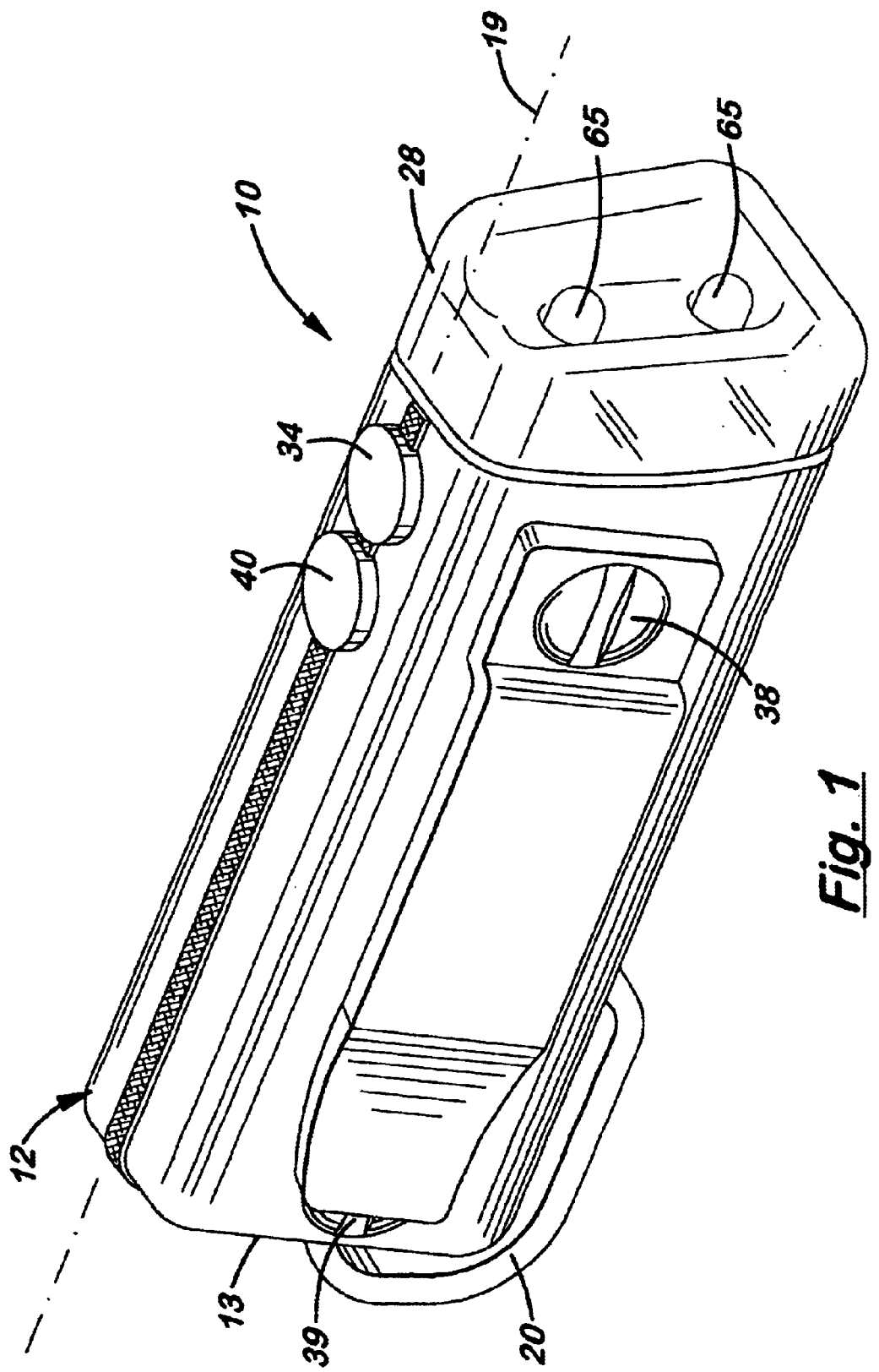

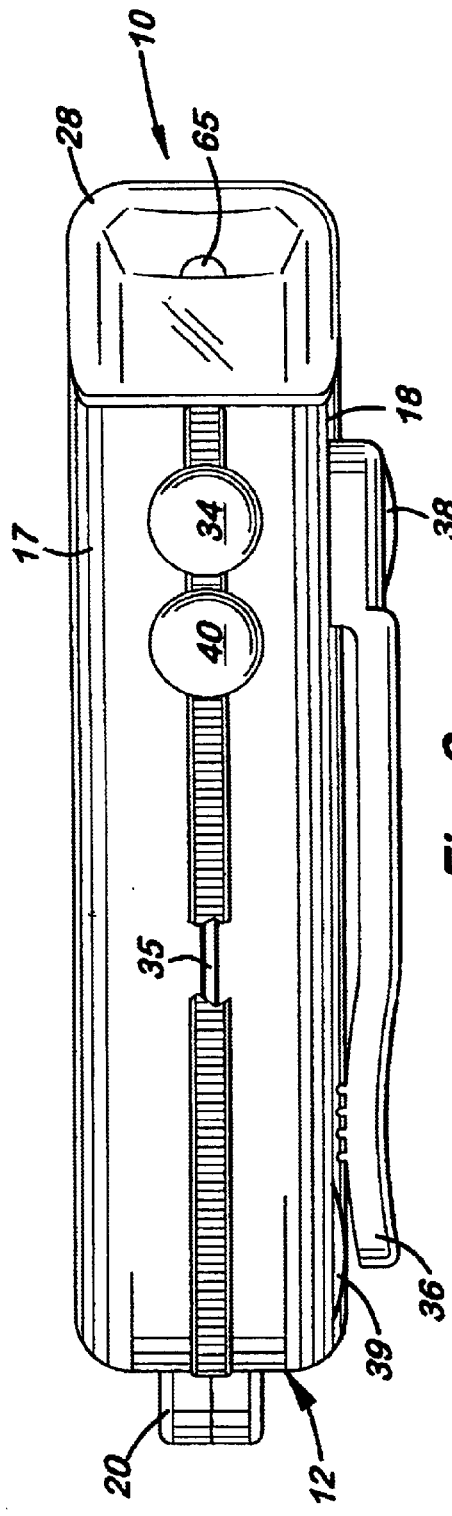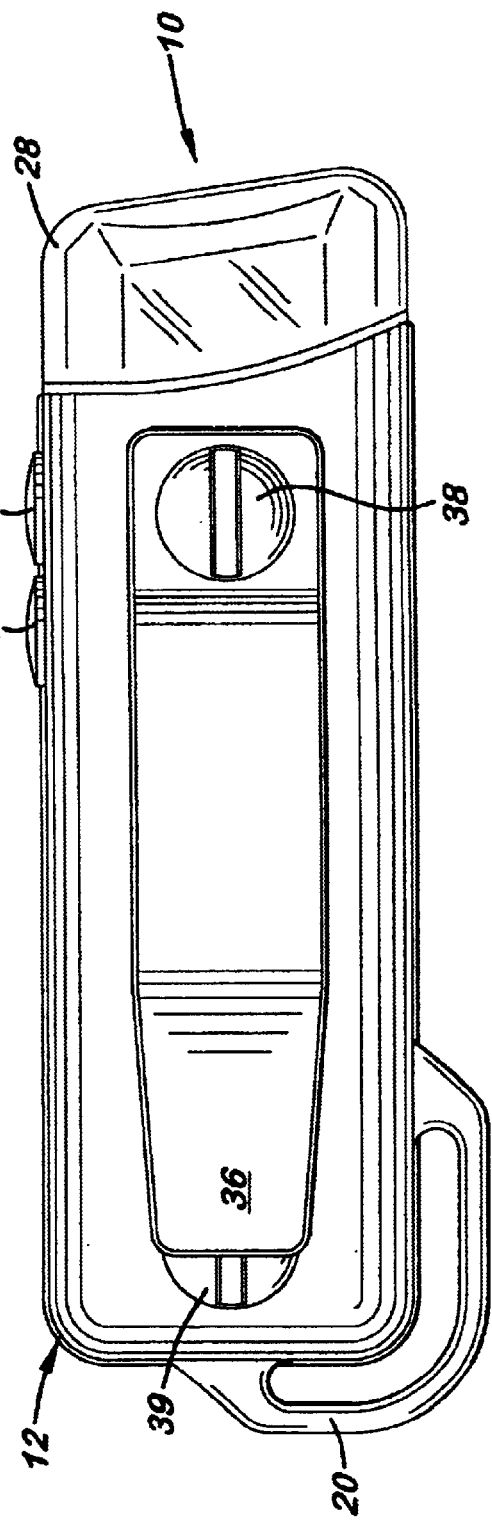

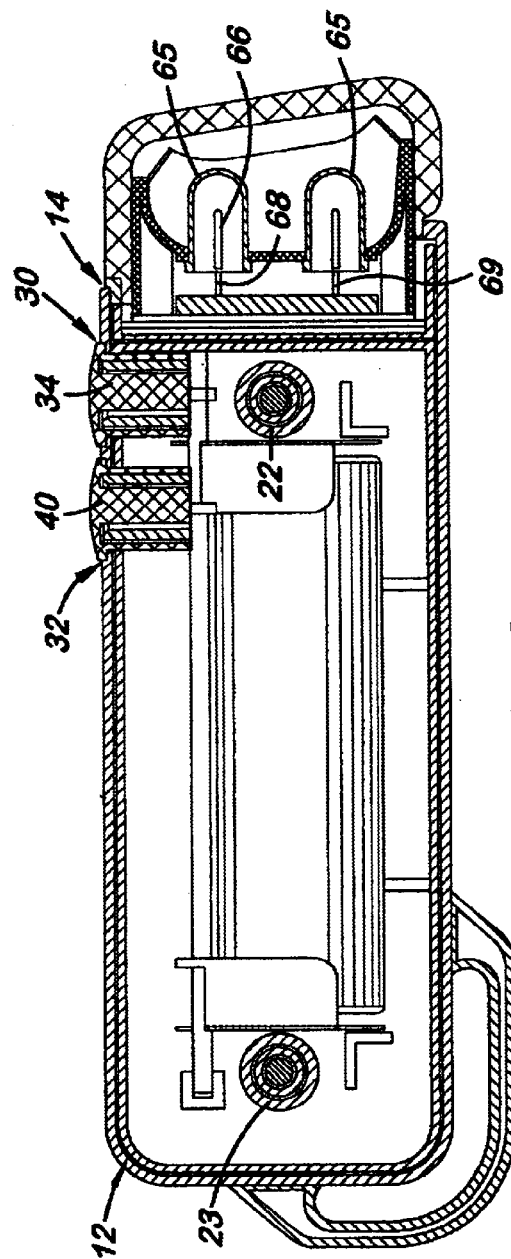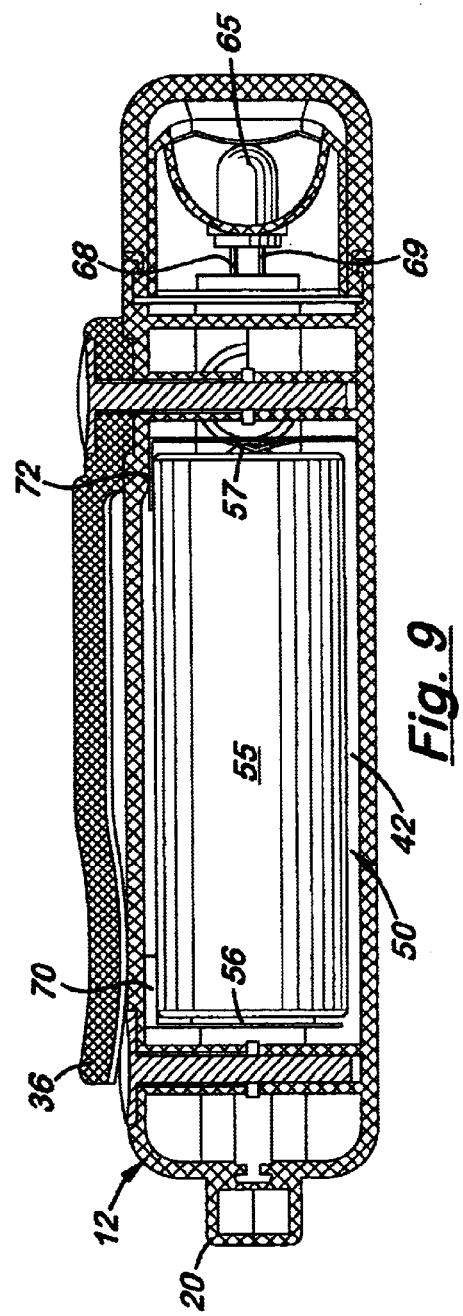
Fig. 8
Fig. 9

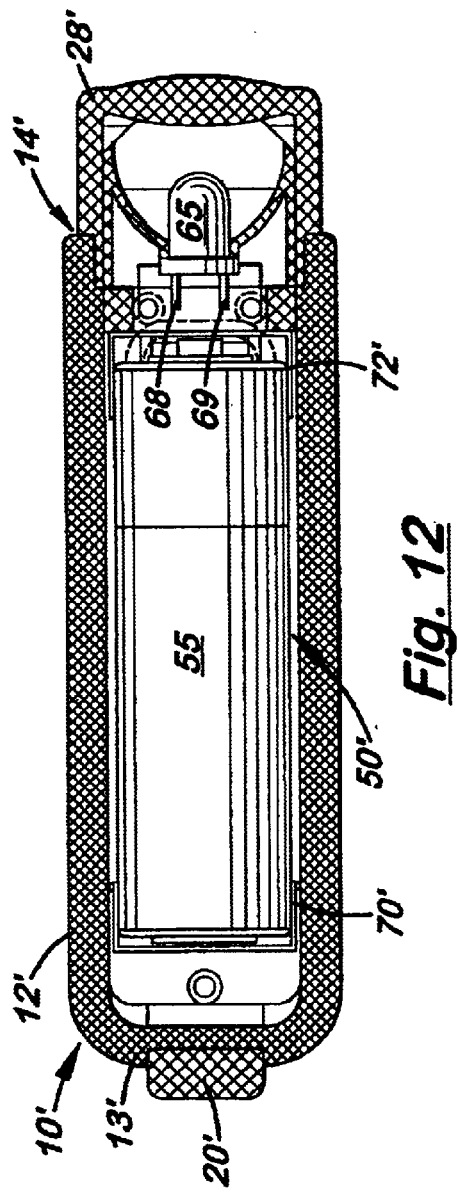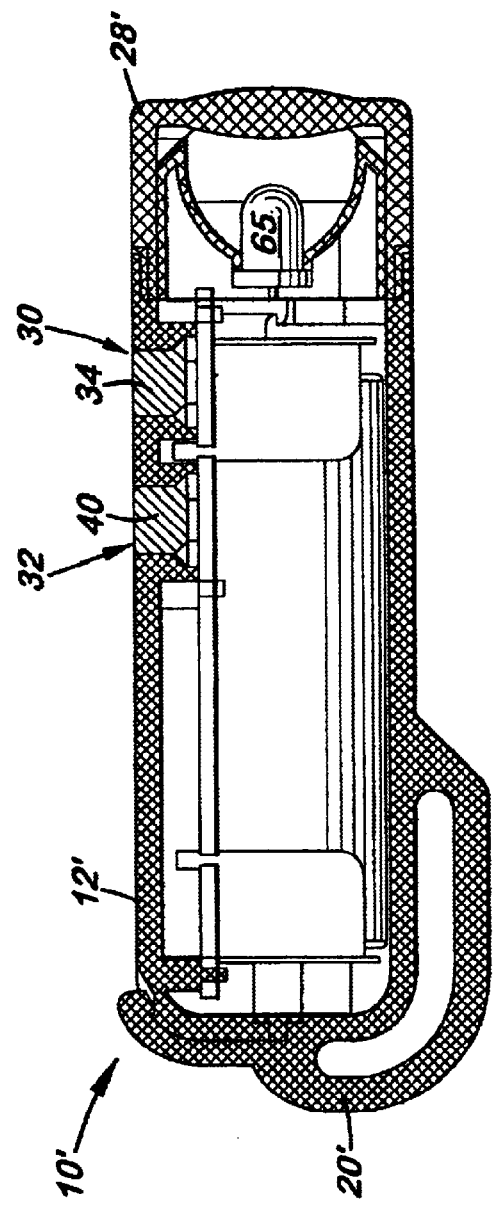

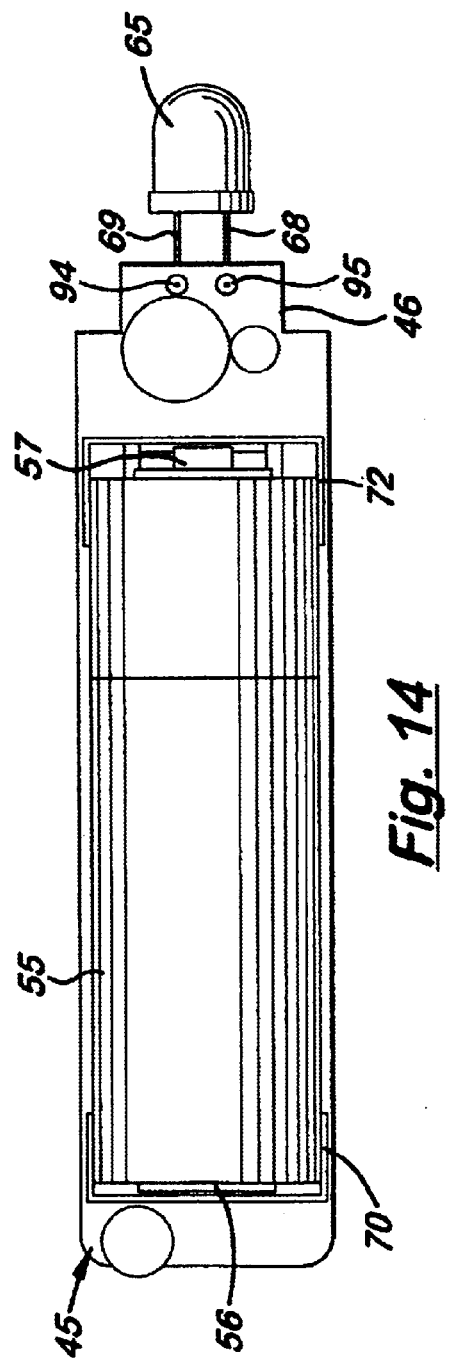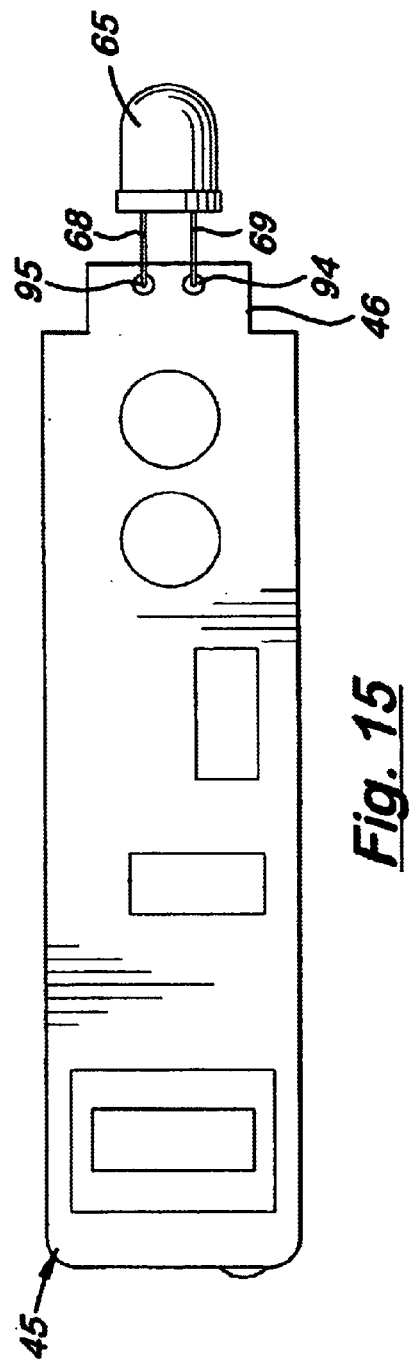

WATERTIGHT, LOW POWER L.E.D. FLASHLIGHT

BACKGROUND OF THE INVENTION

1. Field of the Invention

The present invention relates to flashlights with at least one light emitting diode (L.E.D.) and, more particularly, L.E.D. flashlights that are watertight, lightweight, and have low voltage requirements.

2. Description of the Related Art

It is well known that L.E.D. bulbs are more energy efficient, have longer lives, and are more mechanically reliable than incandescent bulbs. Because of these benefits, they are commonly used in small, portable lights such as flashlights.

L.E.D. flashlights found in the prior art generally consist of one or more L.E.D. bulbs located inside a housing containing a plurality of batteries. Because L.E.D.s require 5 volts of DC current for optimal illumination, at least three AA or AAA batteries connected in a series are used. As a result, most bright L.E.D. flashlights have relatively large housings. When a L.E.D. flashlight with a smaller housing is desired, for example with a L.E.D. key ring or fob, a single battery may be used but that the flashlight illumination will be substantially reduced.

SUMMARY OF THE INVENTION

It is an object of the present invention to provide a lightweight, compact L.E.D flashlight.

It is another object of the present invention to provide one L.E.D. flashlight that includes a step-up power converter that enables it to operate with fewer batteries than normally used in an L.E.D. flashlight and without substantially reduced illumination.

It is a further object of the present invention to provide such an L.E.D. flashlight that includes a watertight housing and switches.

These and other objects are met by the lightweight, compact L.E.D. flashlight that uses a L.E.D. light circuit, a power circuit, and a voltage multiplying circuit. In the preferred embodiment, the power circuit includes a soft momentary switch and a soft dimmer switch connected to a single AA or AAA battery. The L.E.D. light circuit includes one to three L.E.D. bulbs that optimally operate at 5.0 volts. The voltage multiplying circuit raises the battery voltage from 1.5 volts to approximately 5 volts. The flashlight also includes a watertight housing.

DESCRIPTION OF THE DRAWINGS

FIG. 1 is a perspective view of the first embodiment of the L.E.D. flashlight disclosed herein.

FIG. 2 is a top plan view of the embodiment shown in FIG. 1.

FIG. 3 is a right side elevational view of the embodiment shown in FIG. 1.

FIG. 8 is a sectional side elevational view of the embodiment shown in FIG. 1.

FIG. 9 is a sectional bottom plan view of the embodiment shown in FIG. 1.

FIG. 12 is a sectional top plan view of the second embodiment of the invention.

FIG. 13 is a sectional, side elevational view of the second embodiment of the invention.

FIG. 14 is a left side elevational view of the printed circuit board used in the second embodiment of the invention.

FIG. 15 is a right side elevational view of the printed circuit board used in the second embodiment of the invention.

DESCRIPTION OF THE PREFERRED EMBODIMENT(S)

Figure 4:
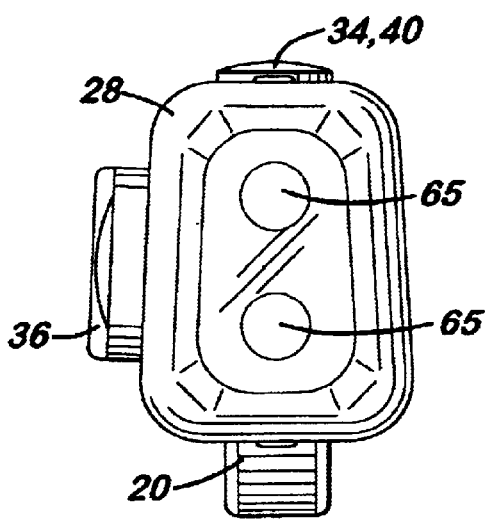
FIG. 4 is a front elevational view of the embodiment shown in FIG. 1.
Figure 5:
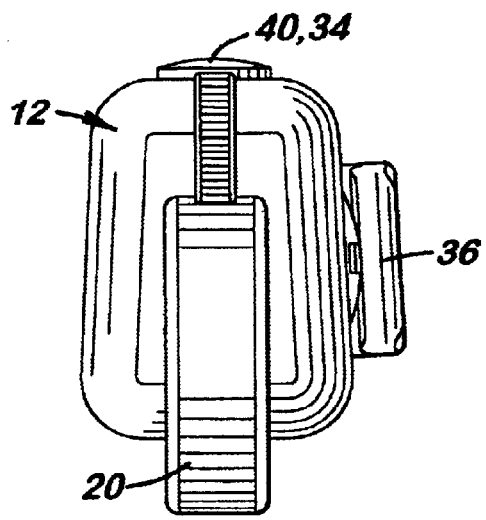
FIG. 5 is a rear elevational view of the embodiment shown in FIG. 1.
Figure 6:
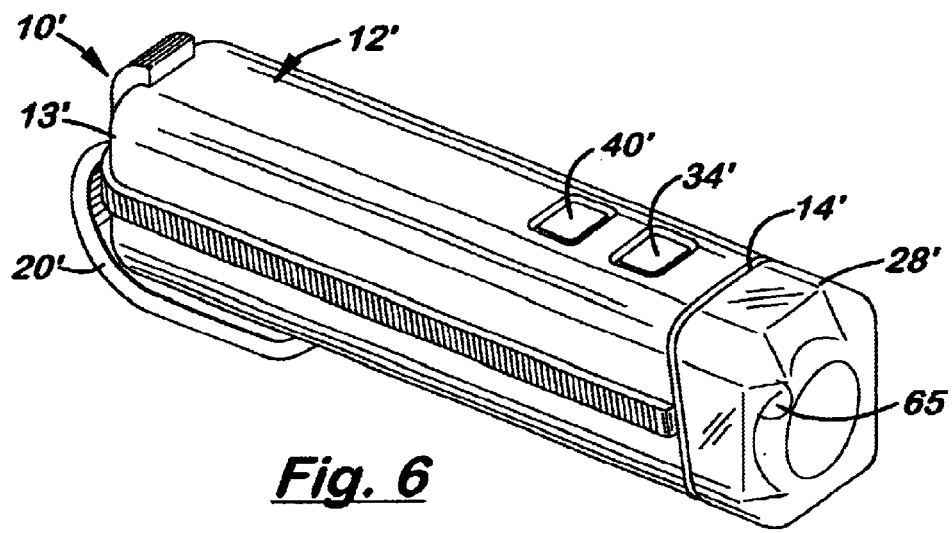
FIG. 6 is a perspective view of the second embodiment of the invention.
Figure 7:
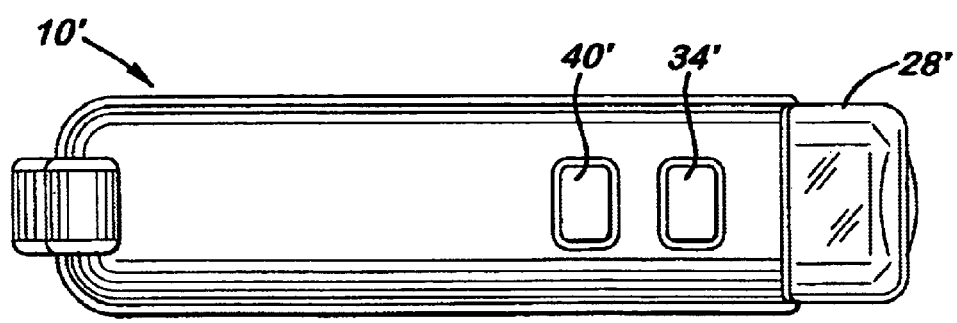
FIG. 7 is a top plan view of the embodiment shown in FIG. 6.

Referring to the accompanying Figures, there is shown and described a lightweight, compact multiple and single L.E.D. flashlight, denoted 10, 10', respectively. Each embodiment 10, 10', shown more clearly in FIGS. 1–5, and 6, 7, respectively, includes an elongated hollow main body 12, 12', with a closed end 13,13' and a transparent lens 28, 28' that attaches over an open end 14, 14', respectively. Each main body 12, 12', which is made of a clear or colored plastic or similar material, is made of two half components 17, 18 that snap-fit together along the central longitudinal axis 19 of the main body 12 as shown in FIG. 1. Formed on the closed end 13, 13' of the main body 12, 12' is an optional key ring 20, 20', respectively. On the multiple L.E.D. flashlight 10, an optional belt clip 36 is also provided.

On the multiple L.E.D. flashlight 10, hollow transversely aligned posts 22, 23 are formed on the inside surface of the first half component 17 and the second half component 18 on opposite ends of the main body 12, respectively. During assembly, screws 38, 39 are extended through holes formed on opposite half components 17, 18 and connect to the posts 22, 23, respectively (see FIG. 8) to hold the two half components 17, 18 together. In the single L.E.D. flashlight 10', the posts 22, 23 and screws 38, 39 are replaced with brackets (not shown) that enable the two half components 17, 18 to snap fit together. In both embodiments, a gasket 35, shown in FIG. 2, is located along the joining edges of the two half components 17, 18 that creates a watertight seal.

As mentioned above, attached over the open end 14, 14' of the main body 12, 12' is a transparent lens 28, 28', respectively, each made of plastic or similar material. In both embodiments, the lens 28, 28' snaps into the perimeter edges of two half components 17, 18 that form the open end 14, 14'.

As shown in FIGS. 8 and 12, formed on the outer surface of each main body 12, 12' are two switch holes 30, 32 through which a main on/off switch button 34, 34' and an optional dimmer switch button 40, 40' extends, respectively.

Figure 10:
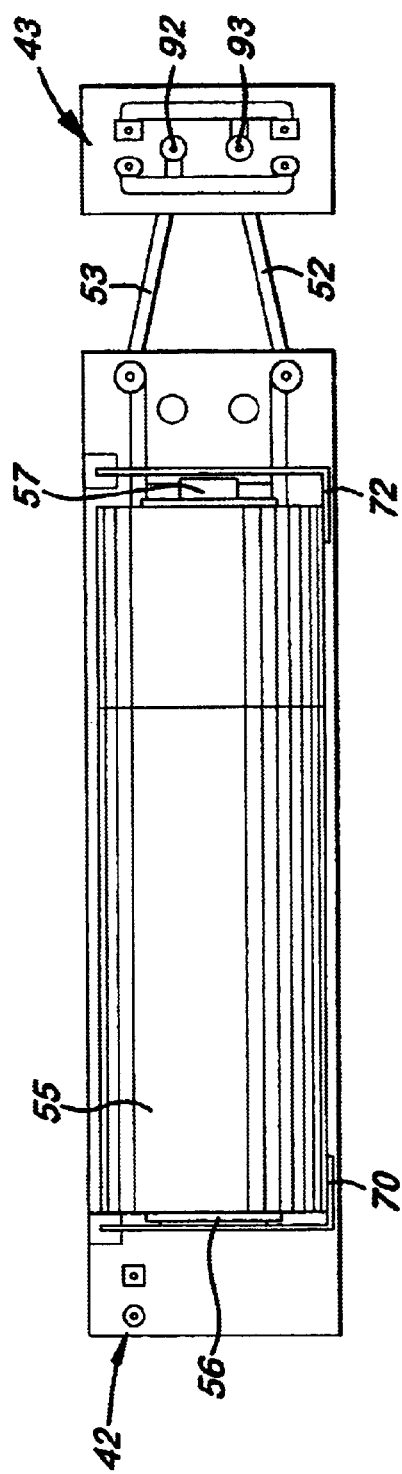
FIG. 10 is a left side elevational view of the printed circuit board.
Figure 11:
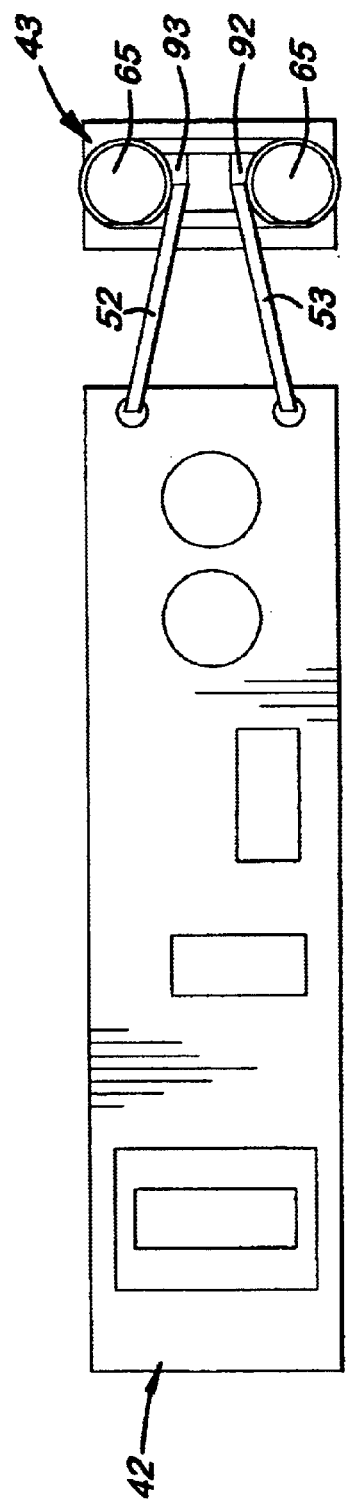
FIG. 11 is a right side elevational view of the printed circuit board.

In the first embodiment, an elongated printed circuit board 42 is longitudinally aligned inside the main body 12. As shown in FIGS. 10 and 11, aligned perpendicularly on the proximal end of the printed circuit board 42 is a smaller, multiple L.E.D. printed circuit board 43. In the second embodiment 10', shown in FIGS. 14 and 15, a single, elongated printed circuit board 45 is longitudinally aligned inside the main body 12'. Longitudinally aligned on the proximal end of the circuit board 45 is an integrally formed neck 46 which contains terminals 94, 95 to which the terminals 68, 69 on the L.E.D. bulb 65 connect. In both embodiments, the main printed circuit boards 42, 45 are slightly off-set from the longitudinal axis 19 of the main body 12, 12' thereby creating a longitudinally aligned cavity 50, 50' for a AA battery 55.

As shown in FIGS. 10 and 11, the multiple printed circuit board 43 has two L.E.D.s bulbs 65 connected thereto that face the open end 14 of the main body 12. Although there is shown two L.E.D.s bulbs 65 mounted on the printed circuit board 43, it should be understood that any desired number of the L.E.D.'s bulbs 65 can be used. Each of the L.E.D. bulbs 65 includes a casing 66 of a lightweight, transparent material, such as a glass, having therein a light emitting diode 67. One terminal 68 of each L.E.D. bulb 65 connects to a first terminal 92 located on the L.E.D. printed circuit board 43. The other terminal 69 of each L.E.D. bulb 65 connects to a second terminal 93 located on the printed circuit board 43. The terminals 92, 93 are electrically connected to two terminals, 94, 95 located on the main printed circuit board 42 via wires 52, 53. As shown in FIGS. 12 and 13, and as mentioned above, the first and second terminals 68, 69 on the single L.E.D. bulb 65 used in the second embodiment 10' are directly connected to two terminals 94, 95 formed on the neck 46. In both embodiments, the L.E.D.'s bulbs 65 emit white light.

As also shown in FIGS. 10 and 14, attached to opposite ends of each printed circuit board 42, 45 are two contact strips 70, 72, respectively, that connect to the positive and negative terminals 56, 57, respectively, on a battery 55. In both embodiments, a single AA battery 55 is longitudinally aligned inside the battery cavity 50 and connected between the two contact strips 70, 72 or 70', 72'.

Figure 16:
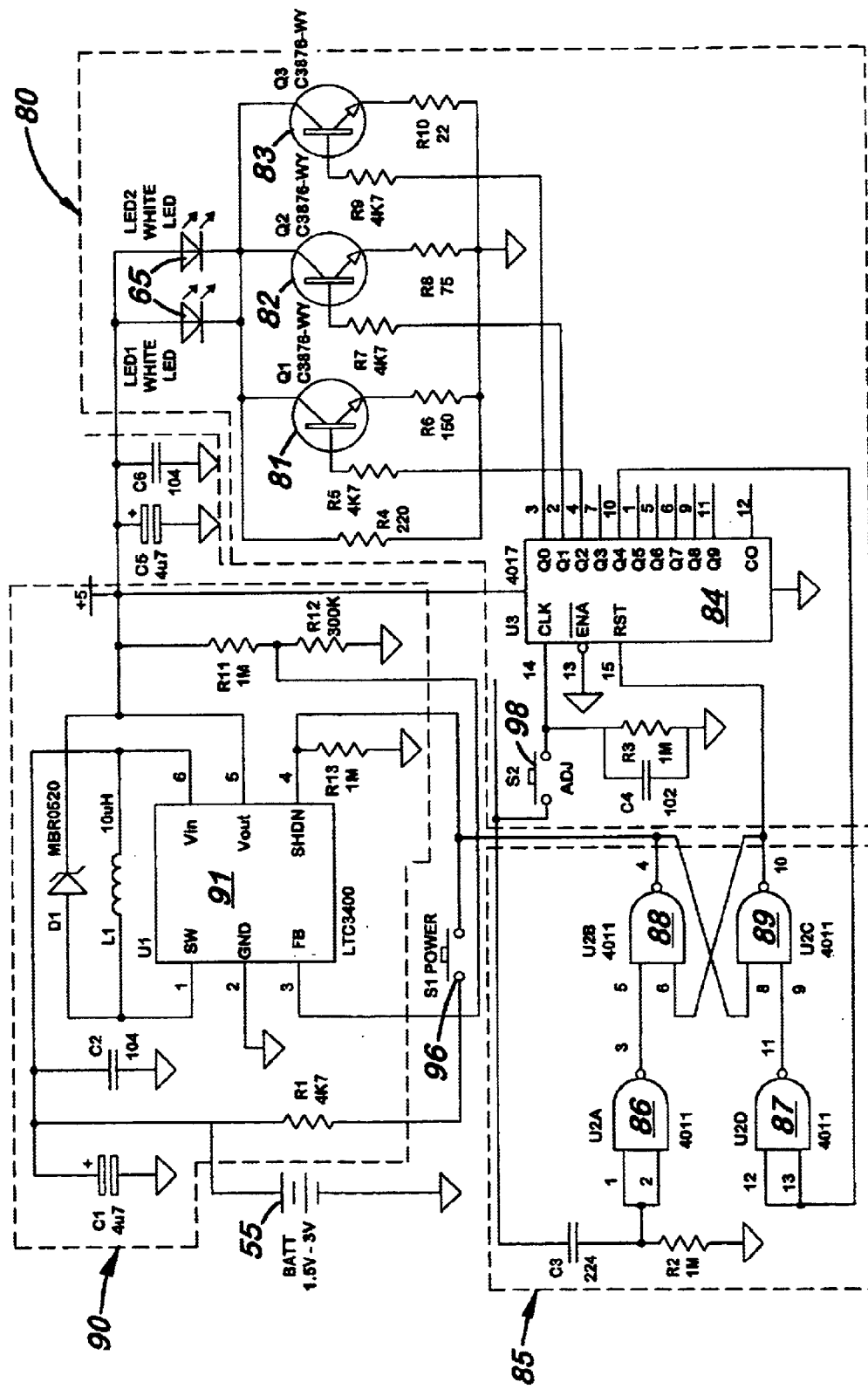
FIG. 16 is a schematic diagram of the electrical circuits used in the first embodiment of the L.E.D. flashlight.
Figure 17:
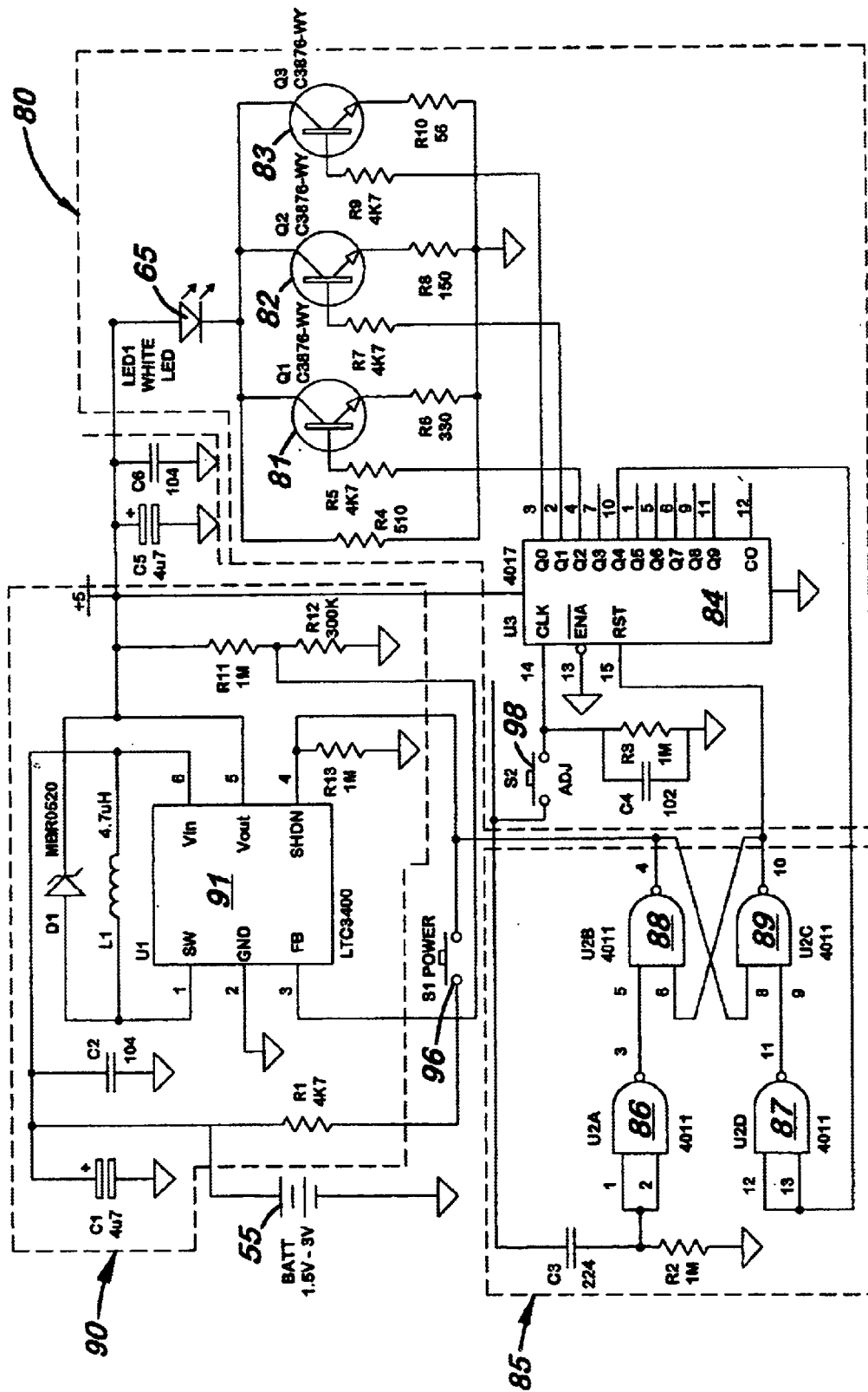
FIG. 17 is a schematic diagram of the electrical circuits used in the second embodiment of the L.E.D. flashlight.

FIGS. 16 and 17 are schematics of the two printed circuit boards 42, 45 used in the first and second embodiments 10, 10' of the flashlight, respectively. Each printed circuit board 42, 45 includes a light circuit 80, a power circuit 85, and a voltage multiplying circuit 90. The light circuit 80 includes at least one L.E.D. bulb 65 connected to three NPN transistors 81–83 connected in a series to a CMOS semi-conductor 84. An optional dimmer switch 98 is connected between the CMOS semi-conductor 84 and the L.E.D. bulb 65. The power circuit 85 includes a main on/off switch 96 and four NAND logic gates 86–89 that control the switch control logic and the brightness control logic. The voltage multiplying circuit 90 includes a synchronous boost converter 91 that connects to a 1.5 volt battery 55 and triples the voltage.

In the preferred embodiment, the synchronous boost converter 91 is a six lead thin SOT with a fixed frequency, step-up DC/DC converted capable of supplying 3.3V at 150 mA from a single AA cell input. Such converters contain an internal NMOS switch and a PMOS synchronous rectifier. An example of a synchronous boost converter (Model No. LTC 3400) that may be used is sold by Linear Technology Corporation located in Milpitas, California.

Table 1 lists the codes, names, and functions of the components shown in FIGS. 16, and 17.

In compliance with the statute, the invention described herein has been described in language more or less specific as to structural features. It should be understood, however, that the invention is not limited to the specific features shown, since the means and construction shown, is comprised only of the preferred embodiments for putting the invention into effect. The invention is therefore claimed in any of its forms or modifications within the legitimate and valid scope of the amended claims, appropriately interpreted in accordance with the doctrine of equivalents.

TABLE 1

| Designator | Qty | Description |
| --- | --- | --- |
| C1 | 1 | Miniature Electrolytic Capacitor |
| C2 | 1 | Chip Capacitor |
| C3 | 1 | Chip Capacitor |
| C4 | 1 | Chip Capacitor |
| C5 | 1 | Miniature Electrolytic Capacitor |
| C6 | 1 | Chip Capacitor |
| D1 | 1 | Schottky Barrier Rectifier |
| L1 | 1 | Inductor |
| LED1, LED2 | 2 | Nichia White LED Lamp |
| Q1 | 1 | NPN Transistor |
| Q2 | 1 | NPN Transistor |
| Q3 | 1 | NPN Transistor |
| R1 | 1 | Chip Resistor |
| R10 | 1 | Chip Resistor |
| R11 | 1 | Chip Resistor |
| R12 | 1 | Chip Resistor |
| R13 | 1 | Chip Resistor |
| R2 | 1 | Chip Resistor |
| R3 | 1 | Chip Resistor |
| R4 | 1 | Chip Resistor |
| R5 | 1 | Chip Resistor |
| R6 | 1 | Chip Resistor |
| R7 | 1 | Chip Resistor |
| R8 | 1 | Chip Resistor |
| R9 | 1 | Chip Resistor |
| S1 | 1 | Rubber Key |
| S2 | 1 | Rubber Key |
| U1 | 1 | Synchronous Boost Converter |
| U2 | 1 | CMOS Quad 2-input NAND gate |

I claim:

1. A flashlight comprising, a. a flashlight housing adapted to hold a battery;

b. at least one L.E.D. located in said housing;

c. a voltage multiplier circuit coupled between said L.E.D and the battery when the battery is disposed in said housing, said voltage multiplier circuit includes a digital synchronous boost converter that provides an output voltage greater than the input voltage from the battery and synchronizes the input voltage and the output voltage so that the output voltage is maintained as the input voltage decreases; and, d. an ON-OFF switch connected to said voltage multiplier circuit.

2. The flashlight as recited in claim 1, further including a dimmer switch connected to said voltage multiplier circuit.

3. The flashlight as recited in claim 1, wherein said synchronous boost converter is capable of supplying 3.3 volts at 150 MA.

4. The flashlight as recited in claim 1, wherein said battery supplies 1.5 Volts.

5. The flashlight as recited in claim 1, wherein said flashlight includes two L.E.D.s.

6. The flashlight as recited in claim 1, further including a key ring attached to said housing.

7. The flashlight as recited in claim 1, further including a belt clip attached to said housing.

8. The flashlight as recited in claim 1, further including a reflector located inside said lens and disposed around said L.E.D.

9. The flashlight as recited in claim 1, wherein said housing is watertight.

10. The flashlight as recited in claim 1, further including a belt clip attached to said housing.

* * * * *